Patented Jan. 16, 1923.

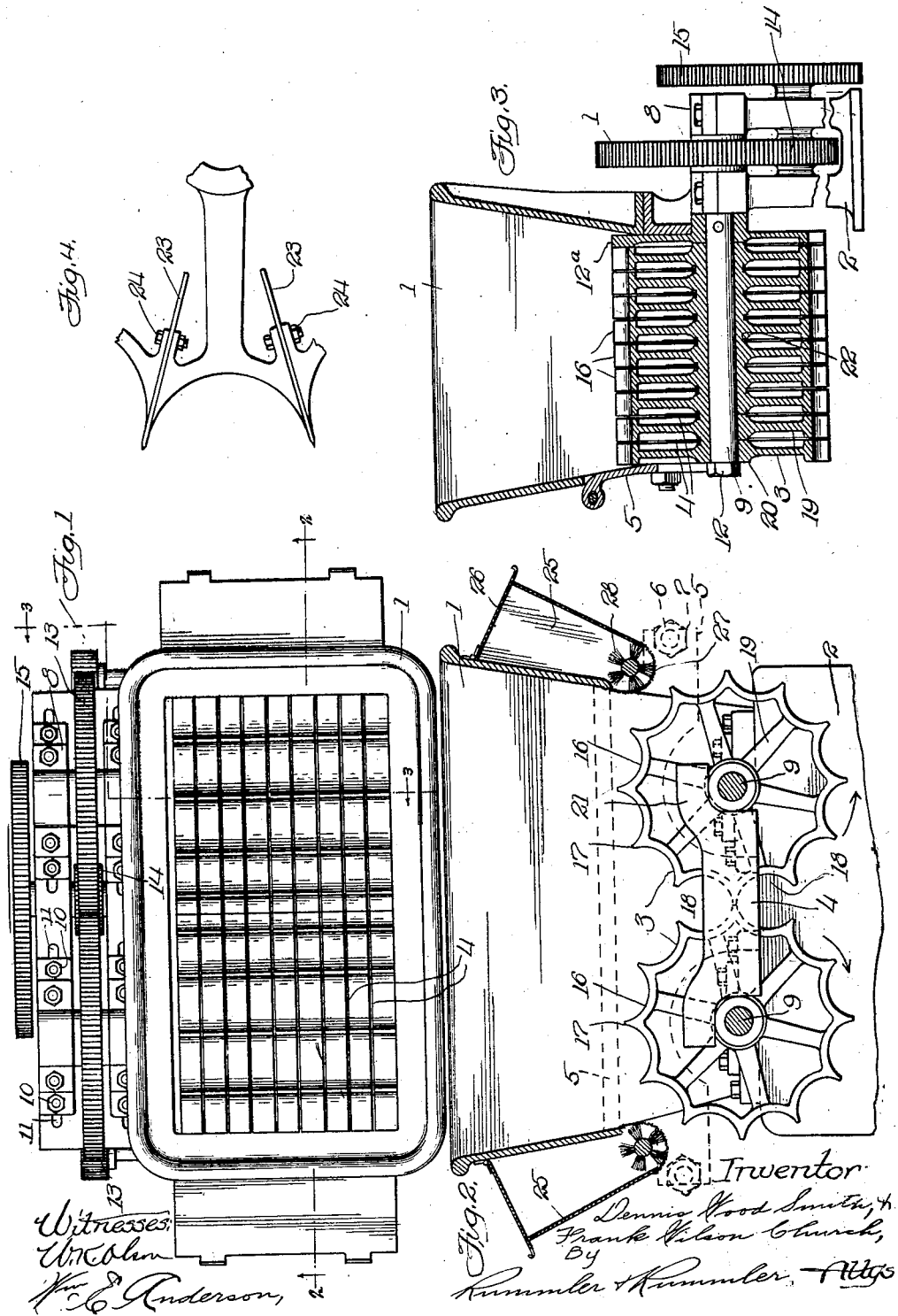

1,442,183

UNITED STATES PATENT OFFICE.

DENNIS WOOD SMITH AND FRANK WILSON CHURCH, OF WILMETTE, ILLINOIS, ASSIGNORS TO COLBORNE MANUFACTURING COMPANY, OF CHICAGO, ILLINOIS, A CORPORATION OF ILLINOIS.

DOUGH DIVIDER.

Application filed April 4, 1921. Serial No. 458,515.

*To all whom it may concern:*

Be it known that we, DENNIS WOOD SMITH and FRANK WILSON CHURCH, citizens of the United States of America, and residents of Wilmette, county of Cook, and State of Illinois, have invented certain new and useful Improvements in Dough Dividers, of which the following is a specification.

The main objects of this invention are to provide an improved form of dough divider especially adapted for cutting a batch of pie dough into individual pieces, each of proper size to form one layer of crust; to provide an improved form of feeding and molding mechanism; and to provide an improved form and arrangement of cutters.

An illustrative embodiment of this invention is shown in the accompanying drawings, wherein—

Figure 1 is a plan of the device.

Fig. 2 is a vertical section taken on the line 2—2 of Figure 1.

Fig. 3 is a vertical section taken on the line 3—3 of Figure 1.

Fig. 4 is an enlarged fragmentary view showing a modified form of drum.

In making pies the most common method of forming the layers or crusts of pastry consists in kneading a batch of dough into a roll, which is then cut up by hand into pieces having about the proper size to make one crust. With this method, it is difficult to divide the batch into pieces of uniform size and weight.

The present invention is designed to mold a batch of dough into rolls and as each roll is being formed, it is simultaneously cut into pieces of uniform size and weight. Means are also provided for adjusting the molds to form rolls of various sizes.

In the form shown, the device comprises a hopper 1, secured to a supporting frame 2, which carries a pair of molding and feeding drums 3, driven by suitable gearing and each comprising a series of segments spaced apart longitudinally. Cutters 4 are arranged between the segments as hereinafter described.

The hopper extends forwardly of the supporting frame and above the molding and cutting mechanisms and is provided with a hinged front wall section 5, which is arranged to permit the removal of the drums for the purpose of changing the size of the mold. The section 5 is locked by suitable clamps 6 carried by the hopper and engaging recessed lugs 7 formed on opposite ends of the section.

Rotatably mounted in journal bearings 8 of the supporting frame, is a pair of horizontally disposed shafts 9 arranged in parallel spaced relation below the mouth of the hopper for supporting the molding and cutting mechanisms. The journal bearings 8 are secured to the supporting frame by bolts 10, extending through slots 11 formed in the support and arranged to permit lateral adjustment of the bearings and shafts 9 for accommodating drums of various sizes. Threaded on the outer ends of the shafts are nuts 12 which may be used to clamp the segments together and against an end plate 12ª.

Gears 13 mounted on the inner ends of the shafts drive the drums in opposite directions as shown by the arrows in Fig. 2. Meshing with one of these gears, is a pinion 14, which is driven by a driving wheel 15 connected to a motor or other suitable source of power (not shown).

The drums have a like number of deep longitudinal grooves in their peripheries and coact to form roll molding pockets 16, with ridges or teeth 17 between. In the preferred form shown, the drums each comprise a plurality of segments 19 of like construction and having hubs 20. The hubs are of greater thickness than the scalloped rims, so that when the drum is assembled there will be slots between the rim segments to accommodate the cutters 4. The cutter blades 4 are arranged in the spaces between the disks so as to extend in parallel relation across the molds 18 at right angles to the axes of the drums. The ends of the blades are formed to provide arms 21 which are loosely supported in annular recesses 22 formed in the hubs 20. The blades are secured against lateral tilting by the opposed edges of the scalloped rims.

In the modified form of drum shown in Figure 4, the scalloped rims are provided with radially adjustable teeth 23 which form adjustable walls for varying the size of the molds. The walls are in the form of plates which are slotted to engage bolts 24 carried by the disks.

Mounted on opposite sides of the hopper 1, are dusters which are arranged to dust fine flour on to the scalloped peripheries of the drums to prevent the dough from adhering to them. The dusters are each in the form of a hopper 25 having a hinged cover 26, and a screen covered outlet 27 in which is rotatably mounted a brush 28. The brushes are connected to suitable gearing and their rotation is timed so that a small quantity of flour is dusted into each of the pockets which pass below the duster outlets.

In operation, a batch of dough is placed into the hopper 1 and the drums are rotated in the direction of the arrows shown in Fig. 2. The registering pockets 16 mold the dough into a roll which is fed by the teeth 17 across the blades 4 which sever the roll into disks, each of which is of proper size to form one layer or crust of pastry. The supporting frame is of such form as to leave ample clear space below the drums for a conveyor (not shown) for conveying the disks of dough to a table or platform.

Although but one specific embodiment and one modified detail are herein shown and described, it will be understood that numerous details of the construction shown may be altered or omitted without departing from the spirit of this invention as defined by the following claims.

We claim:

1. A dough divider comprising a support, a pair of drums journaled on said support and having registering pockets coacting to form a mold, each of said drums being slotted transversely to form a plurality of toothed rims having a connecting hub, and a cutting blade intersecting said mold and having a part extending between adjacent rims of each of said drums.

2. A dough divider comprising a support, a pair of drums journaled on said support and having registering pockets coacting to form a mold, each of said drums being slotted transversely to form a plurality of toothed rims having a connecting hub, and a cutting blade intersecting said mold and loosely supported on the hubs of said drums for severing the dough carried by said pockets.

3. A dough divider comprising a support, a pair of drums journaled on said support and having registering pockets coacting to form a mold, each of said drums being slotted transversely to form a plurality of toothed rims having a connecting hub, and a cutting blade intersecting said mold and loosely supported on the hubs of said drums for severing the dough carried by said pockets, the opposed faces of the adjacent rims on each of said drums having sliding engagement with said blade for securing it against lateral tilting.

4. A dough divider comprising a support, a pair of drums journaled on said support and arranged to be rotated in opposite directions, said drums having scalloped peripheries to provide registering pockets coacting to form a substantially cylindrical mold, each of said drums being slotted transversely to form a plurality of toothed rims having a connecting hub, and a plurality of cutting blades mounted in the spaces between said rims for severing the dough carried by said pockets, said blades being arranged in substantially parallel spaced relation and loosely supported on the hubs of said drums, the opposed faces of the adjacent rims on each of said drums having sliding engagement with said blades for securing said blades against lateral tilting.

5. A dough divider comprising a support, a pair of drums journaled on said support and having registering pockets coacting to form a mold, a cutter arranged to sever the dough carried by said mold, and a plurality of teeth slidably mounted on said drums and arranged to form side walls for said pockets, said teeth being radially adjustable for varying the size of said pockets.

6. A dough divider comprising a support having a hopper for receiving a batch of dough, a pair of drums journaled on said support below said hopper, said drums being scalloped to provide registering pockets coacting to form a substantially cylindrical mold coextensive with said drums, each of said drums comprising a plurality of toothed disks having connecting hubs, and a plurality of cutting blades intersecting said mold, said blades being arranged in substantially parallel spaced relation and loosely supported on said hubs, said disks having sliding engagement with said blades for securing said blades against lateral tilting, said pockets being arranged to feed the dough from said hopper across said blades.

Signed at Chicago this 1st day of April, 1921.

DENNIS WOOD SMITH.
FRANK WILSON CHURCH.